US009589163B2

United States Patent
Jurisch et al.

(10) Patent No.: US 9,589,163 B2
(45) Date of Patent: Mar. 7, 2017

(54) SENSOR ASSEMBLY, DEVICE AND METHOD FOR DETERMINING VIBRATIONS OF A MEASUREMENT OBJECT, AND MEASUREMENT OBJECT HAVING AT LEAST ONE SUCH SENSOR ASSEMBLY

(71) Applicant: MICRO-SENSYS GMBH, Erfurt (DE)

(72) Inventors: Reinhard Jurisch, Meckfeld bei Bad Berka (DE); Peter Peitsch, Erfurt (DE)

(73) Assignee: MICRO-SENSYS GMBH, Erfurt (DE)

( * ) Notice: Subject to any disclaimer, the term of this patent is extended or adjusted under 35 U.S.C. 154(b) by 9 days.

(21) Appl. No.: 14/379,765

(22) PCT Filed: Feb. 22, 2013

(86) PCT No.: PCT/EP2013/053553
§ 371 (c)(1),
(2) Date: Aug. 20, 2014

(87) PCT Pub. No.: WO2013/124412
PCT Pub. Date: Aug. 29, 2013

(65) Prior Publication Data
US 2015/0254484 A1    Sep. 10, 2015

(30) Foreign Application Priority Data
Feb. 23, 2012 (DE) .................. 10 2012 202 789

(51) Int. Cl.
*G01H 1/00* (2006.01)
*G06K 7/10* (2006.01)
(Continued)

(52) U.S. Cl.
CPC ......... *G06K 7/10415* (2013.01); *G01H 1/003* (2013.01); *G01H 1/12* (2013.01); *G06K 7/10158* (2013.01); *H02J 17/00* (2013.01)

(58) Field of Classification Search
CPC ....... G01H 1/003; G01H 1/12; G01M 13/028; G06K 17/0022; G06K 19/0708; F16C 2233/00
(Continued)

(56) References Cited

U.S. PATENT DOCUMENTS 6,981,333 B2   1/2006   Busch
7,916,030 B2 *  3/2011   Corts ...................... F16C 19/52
                                                        340/10.1

(Continued)

FOREIGN PATENT DOCUMENTS

DE        10051870       7/2001
DE        102007026842   12/2008
(Continued)

OTHER PUBLICATIONS

International Search Report for PCT/EP2013/05353, English translation attached to original, Both Completed by the European Patent Office on Jan. 7, 2014, All together 5 Pages.

Primary Examiner — Thomas Alunkal
(74) Attorney, Agent, or Firm — Brooks Kushman P.C.

(57) ABSTRACT

A sensor assembly for determining vibrations of a measurement object, which sensor assembly is or can be fastened to the measurement object in a bonded, form-closed, and/or force-closed manner, an RFID transponder and an acceleration sensor unit coupled to the RFID transponder, wherein sensor data of the acceleration sensor unit are to be sent by means of the RFID transponder. Also disclosed is a device for determining vibrations of a measurement object, to a measurement object having at least one sensor assembly, and to a method for determining vibrations of a measurement object.

16 Claims, 4 Drawing Sheets (51) Int. Cl.
*G01H 1/12* (2006.01)
*H02J 17/00* (2006.01)
(58) Field of Classification Search
USPC .............................. 340/10.1, 856.4, 683, 7.6
See application file for complete search history.

(56) References Cited

U.S. PATENT DOCUMENTS

| | | | | |
|---|---|---|---|---|
| 8,097,063 B2 * | 1/2012 | Kemeny | ................ | C21C 5/462 |
| | | | | 75/375 |
| 8,534,912 B2 | 9/2013 | Schmidt | | |
| 2002/0154029 A1 | 10/2002 | Watters et al. | | |
| 2006/0103534 A1 * | 5/2006 | Arms | ..................... | E01F 13/12 |
| | | | | 340/572.1 |
| 2006/0244595 A1 * | 11/2006 | Malone | .................. | G01P 1/127 |
| | | | | 340/572.1 |
| 2007/0229248 A1 | 10/2007 | Mott et al. | | |
| 2007/0247285 A1 * | 10/2007 | Rajala | ................... | G01H 1/003 |
| | | | | 340/10.1 |
| 2008/0011091 A1 | 1/2008 | Weldon, Jr. | | |
| 2008/0129525 A1 * | 6/2008 | Barrus | ................. | G08B 25/002 |
| | | | | 340/669 |
| 2009/0091465 A1 * | 4/2009 | Buckingham | ............ | A61B 5/11 |
| | | | | 340/683 |
| 2010/0315204 A1 | 12/2010 | Kamel | | |
| 2010/0326192 A1 | 12/2010 | Petelenz et al. | | |
| 2011/0060535 A1 | 3/2011 | Arms et al. | | |

FOREIGN PATENT DOCUMENTS

DE 102009027585 1/2011
DE 102009028547 2/2011

* cited by examiner

SENSOR ASSEMBLY, DEVICE AND METHOD FOR DETERMINING VIBRATIONS OF A MEASUREMENT OBJECT, AND MEASUREMENT OBJECT HAVING AT LEAST ONE SUCH SENSOR ASSEMBLY

CROSS-REFERENCE TO RELATED APPLICATION

This application is the U.S. national phase of PCT Application No. PCT/EP2013/053553 filed on Feb. 22, 2013, which claims priority to DE Patent Application No. 10 2012 202 789.0 filed on Feb. 23, 2012, the disclosures of which are incorporated in their entirety by reference herein.

The invention relates to a sensor assembly for determining vibrations of a measurement object and a method for determining vibrations of a measurement object.

A multiplicity of different vibration-measuring devices are known from the prior art for the vibration determination of measurement objects, for example machinery or buildings. Thus, for example, it is known to dispose a test bolt on a measurement object, for example on a machine, said bolt having a flange or a screw thread for a measuring head of a vibration-measuring device. The measuring head is to be fixed to the test bolt for the vibration measurement. The measuring head has a vibration sensor and is connected via a cable connection to an evaluation unit.

The object of the invention is to indicate an improved sensor assembly for determining vibrations of a measurement object, an improved device for determining vibrations of a measurement object, a measurement object having at least one improved sensor assembly and an improved method for determining vibrations of a measurement object.

The object is achieved according to the invention by a sensor assembly for determining vibrations of a measurement object with the features of claim 1, a device for determining vibrations of a measurement object with the features of claim 6, a measurement object having at least one sensor assembly with the features of claim 8, and a method for determining vibrations of a measurement object with the features of claim 9.

Advantageous designs of the invention form the subject-matter of the subclaims.

A sensor assembly according to the invention for determining vibrations of a measurement object is or can be attached in a firmly bonded, form-fitted and/or force-fitted manner to the measurement object and comprises an RFID transponder and an acceleration sensor unit coupled with the latter, wherein sensor data of the acceleration unit are to be transmitted via the RFID transponder. The sensor assembly forms a sensor transponder.

The term RFID transponder is used here for a unit of the sensor assembly, also referred to as an RFID interface, i.e. the sensor assembly comprises the RFID transponder, also referred to as an RFID interface, and additionally the acceleration sensor unit.

A measurement object according to the invention has at least one such sensor assembly which is attached in a firmly bonded, form-fitted and/or force-fitted manner to the measurement object.

A device according to the invention for determining vibrations of a measurement object of this type comprises at least one such sensor assembly which is attached in a firmly bonded, form-fitted and/or force-fitted manner to the measurement object, and at least one evaluation unit to control and/or regulate the sensor assembly and/or to read out sensor data of the sensor assembly, wherein the evaluation unit is coupled with an RFID reading device or wherein the RFID reading device is integrated into the evaluation unit.

The attachment of the sensor assembly to the measurement object means here that the sensor assembly can be attached at any given respectively suitable position on the measurement object, for example on an outside of the measurement object or in the measurement object.

The term RFID stands here for "radio-frequency identification" and designates a wireless data transmission method based on electromagnetic waves, i.e. a radio-based data transmission method for which an RFID transponder and an RFID reading device, also referred to as an RFID reader, are required. The RFID transponder is activated by radio signals transmitted to it by the RFID reading device. It normally responds by transmitting a unique identification code and, where appropriate, further information. The measurement point of the measurement object to which the sensor assembly is attached is uniquely identifiable via the unique identification code, and determined sensor data can be uniquely allocated to the respective measurement object. However, the transmission of the unique identification code is not absolutely necessary. It is also possible for the RFID transponder to transmit only the other information to the RFID reading device.

This sensor assembly, the measurement object with the sensor assembly attached to it in a firmly bonded, form-fitted and/or force-fitted manner and the device enable a simple, economical, high-precision vibration determination which is not corrupted by external interferences, since the sensor data of the acceleration sensor unit can be read out touchlessly, in particular wirelessly, by means of the RFID reading device. As a result, no touching of the measurement object is required which would interfere with and modify vibrations of the measurement object, as is the case in the prior art. In the case of vibration measurements of this type according to the prior art, a test head with an acceleration sensor is attached to a test bolt of the measurement object. The test head is connected by means of a cable to an evaluation unit. The vibrations of the measurement object are corrupted by this assembly.

The acceleration sensor of the sensor assembly can appropriately be supplied with electrical energy via the RFID transponder, so that the acceleration sensor does not require its own energy source, for example in the form of a battery. The RFID transponder is preferably designed as a passive RFID transponder. A passive RFID transponder of this type does not have its own energy supply, i.e. a battery, but electrical energy can be transmitted through induction onto the RFID transponder by means of electromagnetic waves transmitted by the RFID reading device. This electrical energy can be stored capacitively for a short, temporary period in a capacitor of the RFID transponder. The acceleration sensor unit can also be operated with this electrical energy.

In this way, the sensor assembly can be designed as particularly small and light, since it has no battery requiring substantial installation space. As a result, the sensor assembly can be disposed in a very simple manner at a suitable point, for example on a housing of the measurement object, without disturbing a function of the measurement object or affecting the vibrations of the measurement object. For this purpose, the RFID transponder and the acceleration sensor are preferably designed as a common structural unit and can appropriately be disposed in a common housing, by means of which they can be attached to the measurement object. Furthermore, since no batteries are used, no battery replacement is required either. As a result, a monitoring and maintenance of the sensor assembly and costs associated therewith are substantially reduced or completely eliminated. The sensor assembly is always ready for use, since its energy supply is ensured by the RFID reading device. In this way, a functional failure that would result from a discharged battery is avoided.

Alternatively to a common housing of the sensor assembly, it is also possible to dispose different components of the sensor assembly separately from one another and to interconnect them, for example, via cable. Thus, for example, if a vibration determination is required inside the measurement object, the acceleration sensor unit is disposed inside and the RFID transponder is disposed outside on the measurement object, connected by means of one or more cables. In this way, the touchless data transmission between the RFID transponder and the RFID reading device and the touchless energy transmission between the RFID reading device and the RFID transponder continue to be enabled. If the complete sensor assembly is disposed in the measurement object, this touchless data transmission and energy transmission could be interfered with or completely prevented, for example due to an excessively long distance between the RFID transponder and the RFID reading device and/or due to a metal shielding, for example by the housing of the measurement object.

A sensor assembly of this type has, for example, a diameter of only around 15 mm, a thickness of around 1 millimeter and a weight of around 0.2 g. Compared with a weight of the measurement object, the weight is therefore insignificantly small, so that the measurement object is not affected by the sensor assembly. The sensor assembly can be very simply disposed on the measurement object due to the very small dimensions. Due to the contactless read-out of the RFID transponder, it is also possible to dispose the sensor assembly at relatively inaccessible points on the measurement object, since it is merely necessary to place the RFID reading device sufficiently close to the RFID transponder so that the contact establishment and the data transmission connection between the RFID reading device are enabled.

The sensor assembly is designed in miniaturized form and can be read out wirelessly. In this way, no mechanical coupling between the sensor assembly and the evaluation unit is required. An interference by the evaluation unit with the vibrations of the measurement object to be determined, as in the case of the prior art, is thereby avoided. Furthermore, due to the miniaturized design of the sensor assembly, in particular due to its very low weight, an interference with the vibrations of the measurement object to be determined by the sensor assembly disposed on the latter is avoided or at least significantly reduced. In this way, the sensor assembly and the device enable a high-precision and interference-free determination of the vibrations of the measurement object.

The acceleration sensor unit is preferably designed in such a way that accelerations in one dimension or in a plurality of dimensions of the spatial coordinate system can be measured with it, i.e., for example, accelerations parallel to an x-axis, parallel to a y-axis and/or parallel to a z-axis of the spatial coordinate system, and/or rotational accelerations. The dimensions in which the accelerations can be determined can be appropriately selected in each case by an operator of the device via the evaluation unit and are to be transmitted via the RFID transponder to the acceleration sensor unit.

The sensor assembly appropriately comprises a shield in relation to the measurement object, made from a magnetically permeable material, for example from a ferrite material or from a different magnetically permeable material. This shield is, for example, disposed on a rear side of the sensor assembly facing the measurement object. Due to the shield, an interference with the electromagnetic waves generated by the RFID reading device due to, for example, a metal housing of the measurement object is prevented or at least significantly reduced, since the electromagnetic waves are diverted by the shield in a predefined manner and are deflected from the measurement object, i.e. from its metal housing. The shield is required only if an interference of this type from the measurement object is to be feared, i.e. is probable or certain, particularly if the measurement object and/or its housing is made from an electrically conducting material, i.e. in particular from metal. If this is not the case, because the measurement object is made from a different material, for example from glass, the shield is not required.

The evaluation unit of the device appropriately has at least one input unit, at least one output unit and/or at least one processing unit to process and evaluate received sensor data of the sensor assembly. In this way, specifications for a vibration determination to be carried out in each case can be selected on the evaluation unit of the device and can be transmitted to the sensor assembly. Furthermore, the sensor data received by the sensor assembly can be selected and visualized via the output unit. Moreover, the evaluation unit may have, for example, at least one wireless or wired interface to forward data of the respective vibration determination.

In a method according to the invention for determining vibrations of the measurement object using the device, sensor data of the sensor assembly attached in a firmly bonded, form-fitted and/or force-fitted manner to a measurement object are read out touchlessly, in particular wirelessly, by means of the reading device. The advantages already described of the device or its sensor assembly therefore result from the method which is carried out with the device. A high-precision vibration determination, uncorrupted through touching of the measurement object, is enabled in a simple and economical manner.

In a preferred embodiment of the method, contact is established with the RFID transponder of the sensor assembly touchlessly by means of the RFID reading device, wherein the RFID transponder is supplied by the RFID reading device with electrical energy which is stored in the RFID transponder. The contact between the RFID reading device and the RFID transponder is then interrupted and a vibration determination is carried out by means of the sensor assembly, wherein the acceleration sensor unit of the sensor assembly is supplied with electrical energy via the RFID transponder. Following the vibration determination, the contact between the RFID reading device and the RFID transponder is re-established in order to transmit the sensor data determined by the sensor assembly by means of the RFID transponder to the RFID reading device of the evaluation unit. In this way, it is ensured that the vibration determination is not affected by the evaluation unit and its RFID reading device, and that, for example, the acceleration sensor is also not disturbed by the electromagnetic waves of the RFID reading device.

Furthermore, in this way the sensor assembly or its RFID transponder can be touched with the RFID reading device during the data and energy transmission, i.e. the RFID reading device does not have to be kept at a distance from the RFID transponder, but can also be placed on the latter, so that an optimum wireless contact between the RFID reading device and the RFID transponder is ensured. In this case, although the RFID reading device and the sensor assembly or its RFID transponder touch one another, the contact between them for the data transmission and energy transmission nevertheless continues to take place touchlessly, in particular wirelessly, i.e. no wired interface is present which needs to be touched or contacted for the data and energy transmission. The touching of the RFID transponder or the sensor assembly with the RFID reading device is not absolutely necessary for the data and energy transmission, since the latter can also take place if the RFID reading device is located at a specified distance, but the operation is simplified since the RFID reading device is permitted to touch the RFID transponder or the sensor assembly. The vibration determination is not affected as a result, since it is carried out only after the contact between the RFID reading device and the RFID transponder is again interrupted, i.e. after the RFID reading device is distanced so that it cannot interfere with the vibration determination.

In order to interrupt the contact between the RFID reading device and the RFID transponder, the RFID reading device is, for example, switched off and/or distanced sufficiently far from the sensor assembly so that the electromagnetic waves of the RFID reading device can no longer reach the sensor assembly. A time of the contact interruption can be defined, for example depending on a state of charge of the capacitor of the sensor assembly and/or depending on a contact time or a charging time of the capacitor. It is thereby ensured that the electrical energy stored in the capacitor of the sensor assembly is sufficient for the subsequent activities of the sensor assembly, i.e. at least for the vibration determination or acceleration determination and its storage, until an energy transmission from the RFID reading device to the sensor assembly again takes place due to the renewed establishment of contact for reading out the sensor data from the sensor assembly. The start of the acceleration determination of the vibration determination resulting therefrom can be initiated, for example by a detection of the contact interruption between the RFID transponder and the RFID reading device or by a corresponding time specification, for example by a specified start delay for the vibration determination.

The vibration determination is advantageously started automatically after the contact between the RFID reading device and the RFID transponder has been interrupted. The contact between the RFID reading device and the RFID transponder can, for example, be interrupted and/or the vibration determination can be started automatically as soon as the capacitor or a different energy store of the RFID transponder is fully charged.

In an alternative embodiment of the method, the vibration determination can obviously also be carried out while the RFID reading device is connected to the RFID transponder. No start delay, for example, of the vibration determination is then specified, but rather an immediate start of the vibration determination. In this way, a constant energy supply of the RFID transponder and the acceleration sensor unit via the RFID reading device is ensured, so that, for example, vibration determinations can also be carried out over a lengthy time period. However, it must be ensured that the vibration determination is not interfered with by the electromagnetic field of the RFID reading device or that possible interferences of this type are taken into account as a possible error source in an evaluation of the determined vibrations.

The sensor assembly, the device and the method are, for example, usable for measurement objects which are designed as a structure, for example as a building, a bridge or a road, as a building foundation, as a carriageway or in particular as a machine or installation, for example as a motor, a generator, a turbine, a wind engine or a generator or as their bearing or shaft. The sensor assembly, the device and the method can be used, for example, for servicing and maintenance purposes or for analyses of production processes, installations or technologies. Fields of application are, for example, vibration measurements on measurement objects of this type in the chemical industry, on power stations, in the steel industry or in paper manufacture.

Vibration determinations of this type are often crucial for detecting possible damage, for example defective bearings, as early as possible during routine checks, enabling a very fast response thereto. As a result, long downtimes and high costs associated therewith can be avoided. Furthermore, as well as the vibration determination, position determinations are also possible by means of the sensor assembly, the device and the method through the determination of accelerations. This enables, for example, a tilting determination, for example of vessels, through a determination of the acceleration during a tilting process.

Furthermore, the sensor assembly, the device and the method also enable, for example, a monitoring of sensitive goods that could be damaged through excessively strong vibrations, for example sheets of glass or semiconductor wafers. In this case, the goods item to be monitored is the measurement object to which at least one sensor assembly is attached at a suitable point in a firmly bonded, form-fitted and/or force-fitted manner. One or more evaluation units are then disposed, for example, at points to be examined in a production process, at which, for example, powerful accelerations of the respective goods item occur through a production plant, due to limit stops or due to fast rotational movements.

The evaluation units or at least their RFID reading devices are disposed, for example, in a stationary manner at these points or are moved briefly parallel to the measurement object. In the area of the respective RFID reading device, the sensor assembly is activated by the electromagnetic waves of the RFID reading device, i.e. by its radio-frequency field, and performs the required acceleration measurements and the vibration determination resulting therefrom. The sensor data can then, for example, be transmitted immediately to the RFID reading device. If a time during which the respective sensor assembly is located in a functional area of the RFID reading device is not sufficient to transmit the sensor data due to the speed of the measurement object to be monitored, the sensor data can also be stored in a non-volatile memory of the sensor assembly and can be read out at a later time with an RFID reading device.

A plurality of sensor assemblies of this type can also be attached to the respective measurement object in order to carry out vibration determinations at a plurality of measuring points. In this case, for example, an RFID reading device with a correspondingly designed antenna can also activate and read out a plurality of sensor assemblies which are located in the functional area of the antenna. This is done, for example, using an anti-collision method for RFID transponders known from the prior art.

Example embodiments of the invention are explained in detail below with reference to drawings.

In the drawings.

Corresponding parts are denoted in all figures with the same reference numbers.

Figure 1:
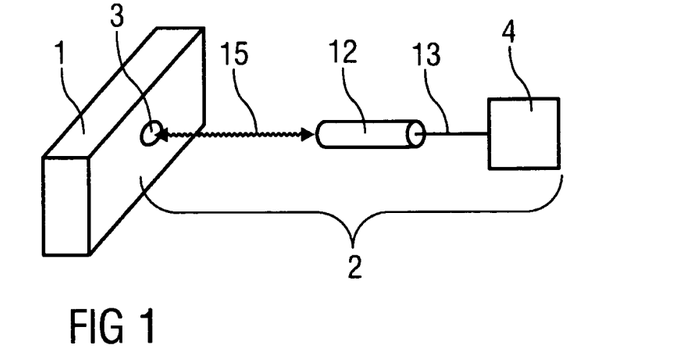
FIG. 1 shows schematically a measurement object and a first embodiment of a device for determining vibrations of the measurement object.
Figure 2:
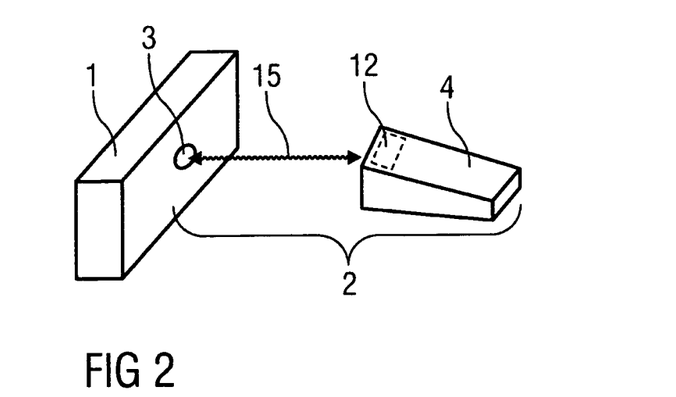
FIG. 2 shows schematically a measurement object and a second embodiment of a device for determining vibrations of the measurement object.

FIGS. 1 and 2 show schematically a measurement object 1 and a device 2 for determining vibrations of the measurement object 1. The measurement object 1 is, for example, designed as a structure, for example as a building, a bridge or a road, as a building foundation, as a carriageway or in particular as a machine or installation, for example as a motor, a generator, a turbine, a wind engine or a generator or as their bearing or shaft. Furthermore, the measurement object 1 can be designed as a goods item which could be damaged by excessively strong vibrations, for example a sheet of glass or a semiconductor wafer.

Figure 3:
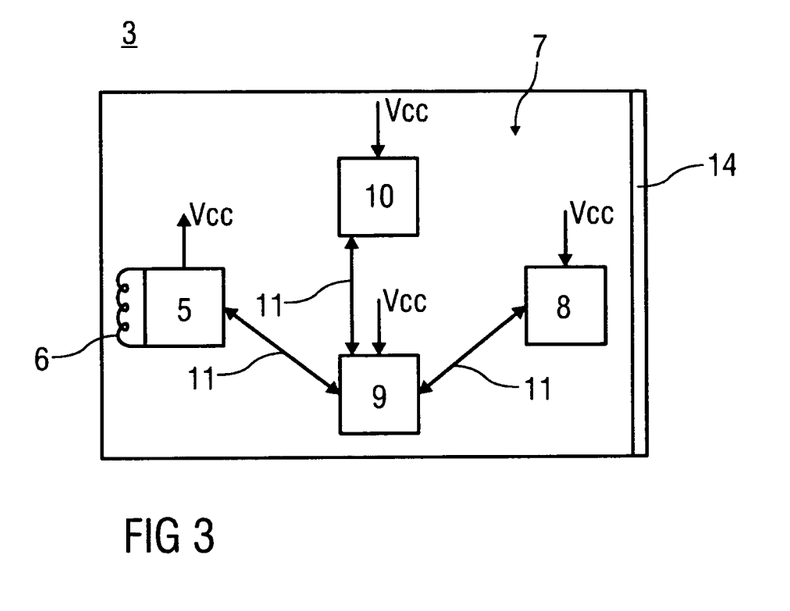
FIG. 3 shows schematically a sensor assembly for determining vibrations of a measurement object.

The device 2 has a sensor assembly 3 and an evaluation unit 4. The sensor assembly 3, which is shown in detail in FIG. 3, is attached to the measurement object 1 in a firmly bonded, form-fitted and/or force-fitted manner, for example glued on or screwed on. It comprises an RFID transponder 5 which has an antenna 6 for receiving and transmitting electromagnetic waves, i.e. for receiving and transmitting radio-frequency signals (RF signals) or ultra-high-frequency signals (UHF signals). The antenna 6 is designed in this example as an antenna coil. In further example embodiments, it can also be designed as a dipole.

Furthermore, the sensor assembly 3 comprises an acceleration sensor unit 7 coupled with the RFID transponder 5. This acceleration sensor unit 7 has an acceleration sensor 8, a control and processing unit 9 designed, for example, as a microcontroller, and a memory 10. The memory 10 and the control and processing unit 9 can be designed, for example, as one structural unit. The control and processing unit 9 has an analog-to-digital converter or is coupled with such a converter in order to digitize analog sensor signals of the acceleration sensor 8 prior to a further processing and/or forwarding.

The memory 10 may be a volatile memory 10, for example a RAM memory, in which data are stored only in the case of a continued energy supply, or a non-volatile memory 10, for example an EEPROM or FRAM, in which data continue to remain stored even without an energy supply. This is useful if the sensor data need to be temporarily stored for a lengthy period. The acceleration sensor 8 is, for example, a micromechanical sensor which determines accelerations on a capacitive basis, or a piezoelectric or a piezoresistive sensor. Further generally known sensors are also possible as an acceleration sensor 8. A plurality of acceleration sensors 8 can also be provided.

The control and processing unit 9 is connected via data connections 11, for example I²C bus connections, to the memory 10, to the acceleration sensor 8 and to the RFID transponder 5. A common data bus can be used for a plurality or all data connections 11, or the data connections 11 are designed as independent data buses.

Sensor data determined by the acceleration sensor 8 are transmitted from the acceleration sensor 8 via the control and processing unit 9 to the memory 10, in which they can be temporarily stored. They are transmitted from the memory 10 via the control and processing unit 9 to the RFID transponder 5 in order to be transmitted via the latter to an RFID reading device 12. Alternatively, the sensor data can also be transmitted directly, without temporary storage, to the RFID reading device 12. As shown in FIG. 2, the RFID reading device 12 is integrated into the evaluation unit 4 or, as shown in the example embodiment in FIG. 1, is coupled with evaluation unit 4 via a cable connection 13. The evaluation unit 4 is designed, for example, as a portable computer, for example as a handheld computer or PDA. However, the RFID reading device 12 can furthermore also be connected, for example, via a wired or wireless data interface to the evaluation unit 4, which can then also be designed as a stationary unit.

Furthermore, commands can be transmitted from the evaluation unit 4 via the latter's RFID reading device to the RFID transponder 5 and from the latter to the control and processing unit 9, so that the acceleration sensor 8 can be controlled accordingly by the control and processing unit 9 in order to start and perform an acceleration measurement according to the parameters specified by the evaluation unit 4. The acceleration unit 7 is furthermore coupled with the RFID transponder 5 for the energy transmission, i.e. both the RFID transponder 5 itself and also the components of the acceleration sensor unit 7, i.e. the acceleration sensor 8, the memory 10 and the control and processing unit 9 are supplied from a supply source Vcc of the RFID transponder 5 so that the acceleration sensor unit 7 does not require its own energy source, for example in the form of a battery.

The RFID transponder 5 is designed as a passive RFID transponder 5, i.e. it does not have its own permanent energy source in the form of a battery, but is supplied with electrical energy by the RFID reading device 12. Electrical energy is induced in the RFID transponder 5 by the electromagnetic waves or the alternating field of said RFID reading device 12. This electrical energy is stored capacitively in a capacitor (not shown here in detail) of the RFID transponder 5. Alternatively or additionally, it is also possible, for example, for the RFID transponder 5 to have a battery to store the induced electrical energy. This battery can be designed as very small due to the very low electrical energy to be stored in each case. The acceleration sensor unit 7 can also be operated with this electrical energy. In this way, the sensor assembly 3 is designed as particularly small and light, so that it can be disposed in a very simply manner at a suitable point, for example on a housing of the measurement object 1, without interfering with a function of the measurement object 1 or interfering with and thereby corrupting the vibrations of the measurement object 1.

Alternatively or additionally to the energy supply of the sensor assembly 3, i.e. of the acceleration sensor unit 7 and/or the RFID transponder 5, provided by the RFID reading device 12, the energy supply can also be provided, for example, by means of energy harvesting, i.e. the conversion of energy forms present at the measurement point by means of devices suitable for this purpose into electrical energy to operate the sensor assembly 3. This device or a plurality of devices of this type can be designed, for example, as a thermocouple, vibration sensor or photoreceiver, i.e., for example, as a solar module. A combination of various devices of this type is also possible.

As shown schematically in FIGS. 1 to 3, the acceleration sensor unit 7 and the RFID transponder 5 are designed as a common structural unit and are disposed in a common housing by means of which they are attached to the measurement object 1. For this purpose, as shown in FIG. 3, the housing has, for example, a corresponding connection element 14 for the firmly bonded, form-fitted and/or force-fitted attachment of the sensor assembly 3 to the measurement object 1. A sensor assembly 3 of this type has, for example, a diameter of only around 15 mm, a thickness of around 1 millimeter and a weight of around 0.2 g. Compared with a weight and size of the measurement object 1, the weight and size are therefore insignificantly small, so that the measurement object 1 is not affected by the sensor assembly 3 or impaired in its operation. The sensor assembly 3 can be very simply disposed on the measurement object 1 due to the very small dimensions. Due to the contactless read-out of the RFID transponder 5, it is also possible to dispose the sensor assembly 3 at relatively inaccessible points on the measurement object 1, since it is only necessary to place the RFID reading device 12 sufficiently close to the RFID transponder 5 in order to establish contact with the latter and enable the data transmission.

Alternatively to a common housing of the sensor assembly 3, it is also possible to dispose different components of the sensor assembly 3 separately from one another and to interconnect them, for example, via cable. Thus, for example, if a vibration determination is required inside the measurement object 1, the acceleration sensor unit 7 is disposed inside and the RFID transponder 5 is disposed outside on the measurement object 1, connected by means of one or more cables. Furthermore, it is also possible, for example, to dispose only the acceleration sensor 8 in the measurement object 1 and to dispose all other components of the sensor assembly 3 outside the measurement object 1 and connect them via cable to the acceleration sensor 8.

In this way, the touchless data transmission between the RFID transponder 5 and the RFID reading device 12 and the touchless energy transmission between the RFID reading device 12 and the RFID transponder 5 continue to be enabled. If the complete sensor assembly 3 is disposed in the measurement object 1, this touchless data transmission could be interfered with or completely prevented, for example due to an excessively long distance between the RFID transponder 5 and the RFID reading device 12 and/or due to a metal shield, for example by the housing of the measurement object 1.

The acceleration sensor unit 7 is designed in such a way that accelerations in one dimension or in a plurality of dimensions of a spatial coordinate system can be measured with it, i.e., for example, accelerations in the x-direction and/or in the y-direction and/or in the z-direction of the spatial coordinate system, and/or rotational accelerations. The respective dimensions in which the accelerations can be measured are selectable here.

If the measurement object 1 or its housing to which the sensor assembly 3 is attached is made from metal, the sensor assembly 3 appropriately has a shield (not shown here) in relation to the measurement object 1, made from a magnetically permeable material, for example from a ferrite material. This shield is, for example, disposed on a rear side of the sensor assembly 3 facing the measurement object 1. An interference with the electromagnetic waves generated by the RFID reading device 12 by, for example, a metal housing of the measurement object 1 is prevented or at least significantly reduced. An interference-free data transmission from the sensor assembly 3 to the evaluation unit 4 and vice versa is thereby ensured and longer transmission paths are enabled, i.e. a longer distance between the RFID reading device 12 and the RFID transponder 5 is possible.

As already described, the evaluation unit 4 of the device 2 is coupled with the RFID reading device 12 in order to read out the RFID responder 5, as shown in FIG. 1, or an RFID reading device 12 of this type is integrated into the evaluation device 4, as shown in FIG. 2. The sensor assembly 3 can be controlled and/or regulated with the evaluation device 4 and sensor data can be read out from the sensor assembly 3 and evaluated in the evaluation unit 4. Furthermore, the evaluation unit 4 appropriately has at least one input unit, at least one output unit and at least one processing unit to process and evaluate the received sensor data of the sensor assembly 3, so that the determined vibrations can be visualized. The vibrations are determined from the sensor data, designed as acceleration data, of the acceleration sensor 8 or the acceleration sensor unit 7, wherein two accelerations in opposite directions in each case produce a vibration. Moreover, in this way, specifications for a vibration determination to be carried out in each case can be selected on the evaluation unit 4 of the device 2 and can be transmitted to the sensor assembly 3. Furthermore, the evaluation unit 4 appropriately has at least one data interface for the wireless or wired data transmission in order to be able to export the results of the vibration determination to other devices.

In a method for determining vibrations of the measurement object 1 using the device 2, the sensor data of the sensor assembly 3 attached in a firmly bonded, form-fitted and/or force-fitted manner to the measurement object 1 are read out touchlessly by means of the RFID reading device 12. Contact is preferably established with the RFID transponder 5 of the sensor assembly 3 touchlessly by means of the RFID reading device 12 of the evaluation unit 4, wherein the RFID transponder 5 is supplied by the RFID reading device 12 with electrical energy which is stored in the RFID transponder 5. The contact between the RFID reading device 12 and the RFID transponder 5 is then interrupted and a vibration determination is carried out by means of the sensor assembly 3, wherein the acceleration sensor unit 8 of the sensor assembly 3 is supplied with electrical energy via the RFID transponder 5. Following the vibration determination, the contact between the RFID reading device 12 and the RFID transponder 5 is re-established in order to transmit the sensor data determined by the sensor assembly 3 by means of the RFID transponder 5 to the RFID reading device 12 of the evaluation unit 4. In this way, it is ensured that the vibration determination is not affected by the evaluation unit 4 and its RFID reading device 12, and that, for example, the acceleration sensor 8 is also not disturbed by the electromagnetic waves of the RFID reading device 12.

The touchless contact between the RFID reading device 12 and the RFID transponder 5 of the sensor assembly 3 is shown schematically in FIGS. 1 and 2 by a wavy double arrow 15, wherein the wireless communication connection for the data transmission between the RFID transponder 5 and the RFID reading device 12 is a two-way communication connection via which data can be transmitted from the RFID transponder 5 to the RFID reading device 12 and from the RFID reading device 12 to the RFID transponder 5. An energy transmission, on the other hand, takes place only from the RFID reading device 12 onto the RFID transponder 5.

The vibration determination takes place via a one-dimensional or multi-dimensional, time-dependent determination of the occurring accelerations at the measuring point at which the sensor assembly 3 is attached to the measurement object 1. Occurring vibration frequencies and associated amplitudes can be determined from time-dependent acceleration measurements, for example, by means of a Fourier analysis. In a normal operating case of the respective measurement object 1, a typical frequency spectrum is produced here which is dependent on the respective measurement object 1 or the respective measuring point on the measurement object 1. This typical frequency spectrum can also be advantageously stored in the memory 10 of the sensor assembly 3 and/or in a memory unit of the evaluation unit 4. If a clear deviation from this typical frequency spectrum is established in a vibration determination, a substantial change to the measurement object 1, which suggests damage, can be assumed. On the basis of the changed spectrum measured in this way, with a sufficiently available comparison basis of frequency spectra and with damage present during the measurement thereof, damage respectively present in the current case can be inferred, or a confinement to a number of damage variants is at least possible. The Fourier analysis can be carried out in the evaluation unit 4 or even in the sensor assembly 3, i.e. in its control and processing unit 9. The latter option has the advantage that significantly fewer data need to be transmitted via the contactless interface, i.e. from the RFID transponder 5 to the RFID reading device 12. This results in shorter read-out times.

During the first contact between the RFID reading device 12 and the RFID transponder 5, along with the energy transmission, a start time, for example, for the vibration determination, for example immediately or with a specified start delay, can be specified by means of the evaluation unit 4 through a data transmission. Furthermore, it can be specified whether accelerations and vibrations resulting therefrom in the direction of the x-axis, the y-axis and/or the z-axis of the spatial coordinate system and/or rotational accelerations are to be measured. Furthermore, for example, further specifications can be brought into play, for example a sampling rate, a resolution, an acceleration value up to which the accelerations are to be measured and/or visualized, a bandwidth, a measurement interval and/or a number of measurement values.

During each contact between the RFID transponder 5 and the RFID reading device 12 or at least during one of the contacts, a unique identification code of the RFID transponder 5 is appropriately transmitted by the latter to the RFID reading device 12 so that the RFID transponder 5 and, via it, the measurement object 1 to which it is attached are uniquely identifiable and, as a result, the determined sensor data can be uniquely allocated to the respective measurement object 1 or, in the case of a multiplicity of sensor assemblies 3 on the measurement object 1, can be uniquely allocated to a respective area on the measurement object 1 to which the respective sensor assembly 3 is attached.

The sensor assembly 3, the measurement object 1 with the sensor assembly 3 attached to it in a firmly bonded, form-fitted and/or force-fitted manner, the device 2 and the method enable a simple, economical, high-precision vibration determination which is not corrupted by external influences, since the sensor data of the acceleration sensor unit 7 can be read out touchlessly by means of the RFID reading device 12. As a result, no touching of the measurement object 1, which would affect and alter vibrations of the measurement object 1, is required. Furthermore, in the preferred alternative method, the acceleration values are determined by means of the acceleration sensor 8 only after the contact between the sensor assembly 3 and the RFID reading device 12 has been interrupted. As a result, the acceleration determination and the vibration determination resulting therefrom are not affected by the electromagnetic field of the RFID reading device 12.

The sensor assembly 3, the device 2 and the method can be used, for example, for servicing and maintenance purposes or for analyses of production processes, installations or technologies. Fields of application are, for example, vibration measurements on measurement objects 1 in the chemical industry, on power stations, in the steel industry or in paper manufacture. Vibration determinations of this type are often crucial for detecting possible damage, for example defective bearings, as early as possible during routine checks, enabling a very fast response thereto. As a result, long downtimes and high costs associated therewith can be avoided. Furthermore, position determinations are also possible by means of the sensor assembly 3, the device 2 and the method through the determination of accelerations. This enables, for example, a tilting determination, for example of vessels, through a determination of the acceleration during a tilting process.

If the measurement object 1 is a goods item to be monitored, the evaluation units 4 are then disposed, for example, at points to be examined in a production process, at which, for example, powerful accelerations of the respective goods item occur through a production plant, due to buffer stops or due to fast rotational movements. The evaluation units 4 or at least their RFID reading devices 12 are disposed, for example, in a stationary manner at these points or are moved briefly parallel to the measurement object 1. In the area of the respective RFID reading device 12, the sensor assembly 3 is activated by the electromagnetic waves of the RFID reading device 12, i.e. by its radio-frequency field, and performs the required acceleration measurements and the vibration determination resulting therefrom. The sensor data can then, for example, be transmitted immediately to the RFID reading device 12. If a time during which the sensor assembly 3 is located in a functional area of the RFID reading device 12 is not sufficient to transmit the sensor data due to the speed of the measurement object 1 to be monitored, the sensor data can also be stored in a non-volatile memory 10 of the sensor assembly 3 and can be read out at a later time with an RFID reading device 12.

A plurality of sensor assemblies 3 of this type can also be attached to the respective measurement object 1 in order to carry out vibration determinations at a plurality of measuring points. In this case, for example, an RFID reading device 12 with a correspondingly designed antenna 6 can also activate a plurality of sensor assemblies 3 which are located in the functional area of the antenna 6. This is done, for example, using an anti-collision method for RFID transponders 5 known from the prior art.

In the case of an RF solution, the sensor assembly 3 has, for example a diameter of around 15 mm and a thickness of around 3 mm. In the case of a UHF solution, the sensor assembly 3 has, for example, a length of around 50 mm, a width of around 15 mm and a thickness of around 3 mm. A weight of the sensor assembly is, for example, less than 5 grams.

Figure 4:
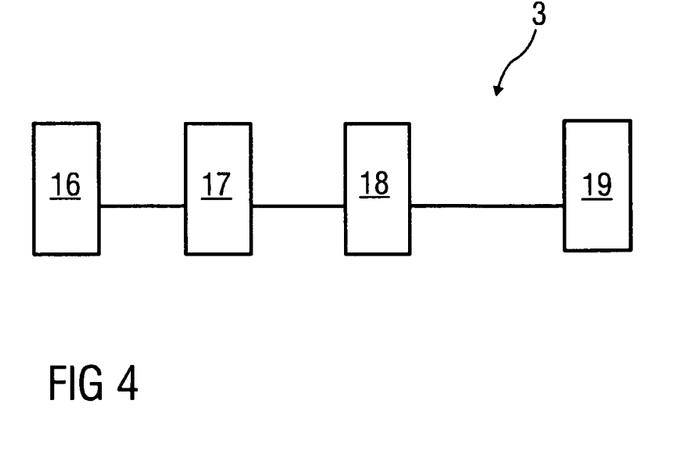
FIG. 4 shows schematically a further embodiment of a sensor assembly for determining vibrations of a measurement object.
Figure 5:
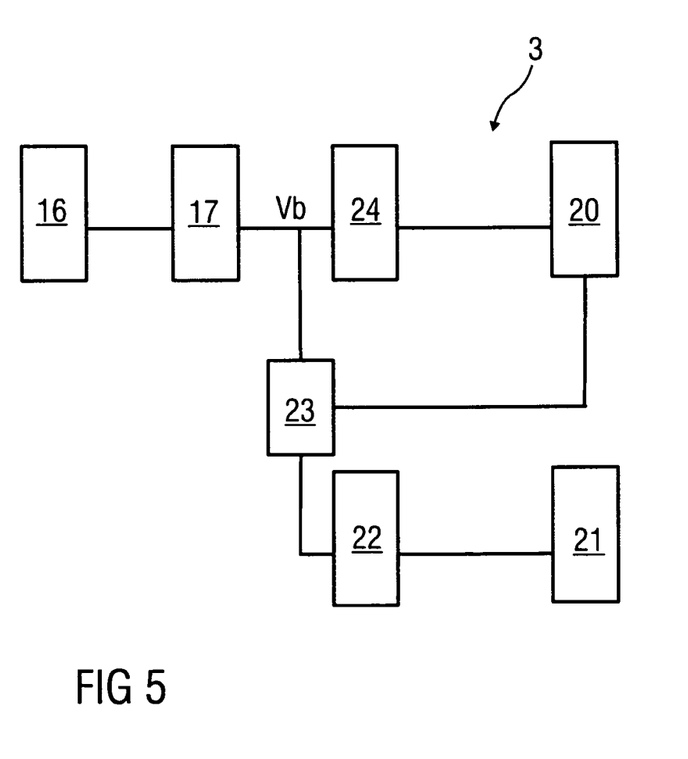
FIG. 5 shows schematically a further embodiment of a sensor assembly for determining vibrations of a measurement object.
Figure 6:
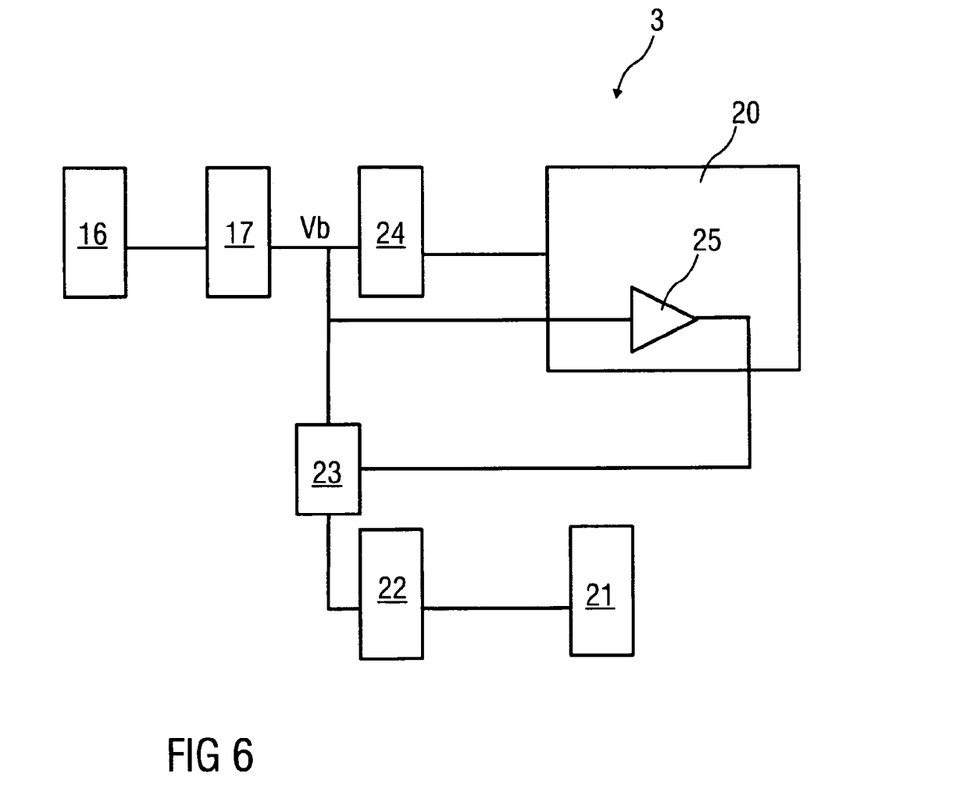
FIG. 6 shows schematically a further embodiment of a sensor assembly for determining vibrations of a measurement object.

FIGS. 4 to 6 show further embodiments of the sensor assembly 3. FIG. 4 shows a basic circuit of the sensor assembly 3 for LF, RF or UHF transponder circuits, with an antenna unit 16 comprising an antenna 6 and an oscillating circuit, with a rectifier 17, a surge and/or storage capacitor 18 of, for example, around 1 nF to 100 μF and a complete circuit 19 comprising an RFID front-end, the memory 10, a control logic, the acceleration sensor 8, and analog-to-digital converter and further components.

This basic circuit has the following disadvantage: If very large surge and/or storage capacitors 18 are used to improve the signal-to-noise ratio of the acceleration sensor 8, or if the acceleration sensor 8 is to be operated for some time with no electromagnetic energy input, the complete circuit 19 becomes operational only after a late time (high charge time constant: rectifier source impedance×capacitance).

It is often very important to read out, for example, the ID number of the RFID transponder 5, i.e. the unique identification code, very quickly. The embodiments shown in FIGS. 5 and 6 create the possibility for this case. Here, the operating voltage of a circuit component 20 which has the RFID front-end, the memory 10 and the control logic must be isolated from the circuit for operating the sensor system. A small surge capacitor 24 of, for example, around 1 nF is provided for this circuit component 20 with the RFID front-end, the memory 10 and the control logic. The sensor system circuit 21 comprising the acceleration sensor 8 and/or actuator, the sensor logic and the analog-to-digital converter is operated with its own large surge and/or storage capacitor 22 of, for example, up to 100 μF, which in turn is coupled via an isolation circuit 23 to the basic operating voltage Vb. It can thus be ensured that the basic operating voltage Vb is initially charged with a very small time constant. The large surge and/or storage capacitor 22 is isolated from the small surge capacitor 24 by means of the isolation circuit 23 via a resistor, the dimensioning of which depends on the application, and a diode.

In a special case, as shown in FIG. 6, the diode can be replaced or supplemented in the isolation circuit 23 by a remotely controllable switch (MOS transistor). The switch is command-controlled via a voltage comparator 25 which measures the basic operating voltage Vb and/or via the control logic and the wireless RFID interface. The hysteresis of the voltage comparator 25 should then be dimensioned so that the switch opens already with a basic operating voltage Vb which allows a still fault-free operation of the circuit component 20, i.e. the circuit block comprising the RFID front-end, the memory and the control logic. This means, for example, activation at 2.0V and deactivation at 1.8V. It is thus ensured that only so much energy is delivered to the large surge and/or storage capacitor 22 as is then available via the wireless interface.

REFERENCE NUMBER LIST

1 Measurement object
2 Device
3 Sensor assembly
4 Evaluation unit
5 RFID transponder
6 Antenna
7 Acceleration sensor unit
8 Acceleration sensor
9 Control and processing unit
10 Memory
11 Data connection
12 RFID reading device
13 Cable connection
14 Connection element
15 Double arrow
16 Antenna unit
17 Rectifier
18 Surge and/or storage capacitor
19 Complete circuit
20 Circuit component
21 Sensor system circuit
22 Large surge and/or storage capacitor
23 Isolation circuit
24 Small surge capacitor
25 Voltage comparator
Vb Basic operating voltage
Vcc Supply voltage

The invention claimed is:

1. A sensor assembly for determining vibrations of a measurement object, the sensor assembly comprising:
   an RFID transponder,
   an acceleration sensor unit connected to the RFID transponder, and
   a storage capacitor connected between the RFID transponder and the acceleration sensor unit, for capacitively storing electrical energy for a short, temporary period,
   a surge capacitor, isolated from the storage capacitor, connected between the RFID transponder and the acceleration sensor unit, for isolating the RFID transponder from the acceleration sensor unit,
   wherein sensor data of the acceleration sensor unit are to be transmitted via the RFID transponder, and
   wherein the acceleration sensor unit is supplied with electrical energy via the storage capacitor.

2. The sensor assembly as claimed in claim 1, wherein the acceleration sensor unit is supplied with electrical energy via the RFID transponder.

3. The sensor assembly as claimed in claim 1, wherein the RFID transponder is designed as a passive RFID transponder.

4. The sensor assembly as claimed in claim 1, wherein the acceleration sensor unit is designed in such a way that accelerations in one dimension or in a plurality of dimensions of the spatial coordinate system is measured with it.

5. The sensor assembly as claimed in claim 1, comprising a shield in relation to the measurement object made from a magnetically permeable material.

6. A device for determining vibrations of a measurement object, comprising:
   at least one sensor assembly including:
      an RFID transponder,
      an acceleration sensor unit connected to the RFID transponder, and
      a storage capacitor connected between the RFID transponder and the acceleration sensor unit, for capacitively storing electrical energy for a short, temporary period,
      a surge capacitor, isolated from the storage capacitor, connected between the RFID transponder and the acceleration sensor unit, for isolating the RFID transponder from the acceleration sensor unit,
      wherein sensor data of the acceleration sensor unit are to be transmitted via the RFID transponder, and
      wherein the acceleration sensor unit is supplied with electrical energy via the storage capacitor; and
   at least one evaluation unit configured to read out sensor data of the sensor assembly when the evaluation unit is connected to an RFID reading device.

7. The device as claimed in claim 6, wherein the evaluation unit has at least one input unit, at least one output unit and at least one processing unit to process and evaluate received sensor data of the sensor assembly.

8. A measurement object having at least one sensor assembly as claimed in claim 1, wherein the sensor assembly is attached to the measurement object in a manner of at least one of firmly bonded, from-fitted and force-fitted.

9. A method for determining vibrations of a measurement object using a device having a sensor assembly including: an RFID transponder, an acceleration sensor unit connected to the RFID transponder, and a storage capacitor connected between the RFID transponder and the acceleration sensor unit, for capacitively storing electrical energy for a short, temporary period, a surge capacitor, isolated from the storage capacitor, connected between the RFID transponder and the acceleration sensor unit, for isolating the RFID transponder from the acceleration sensor unit, and an evaluation unit configured to read out sensor data of the sensor assembly when the evaluation unit is connected to an RFID reading device, the method comprising:

touchlessly reading out by means of an RFID reading device a sensor data of the sensor assembly attached to the measurement object;
   touchlessly communicating with an RFID transponder of the sensor assembly using an RFID reading device of the evaluation unit;
   supplying the RFID transponder by the RFID reading device with electrical energy;
   storing the electrical energy in the RFID transponder;
   interrupting the communication between the RFID reading device and the RFID transponder;
   carrying out a vibration determination by the sensor assembly;
   supplying the acceleration sensor unit of the sensor assembly with electrical energy via the RFID transponder; and
   re-establishing the communication between the RFID reading device and the RFID transponder following the vibration determination, in order to transmit the sensor data determined by the sensor assembly by means of the RFID transponder to the RFID reading device of the evaluation unit.

10. The sensor assembly as claimed in claim 1, further comprising a microprocessor and a memory connected to the RFID transponder and the acceleration sensor, wherein the sensor data is temporarily stored.

11. The sensor assembly as claimed in claim 1, wherein a capacitance of the storage capacitor is greater than a capacitance of the surge capacitor.

12. The sensor assembly as claimed in claim 1, further comprising an isolation circuit connected between the storage capacitor and the surge capacitor.

13. The sensor assembly as claimed in claim 12, further comprising a voltage comparator connected to the isolation circuit.

14. The method as claimed in claim 9, wherein communication is established touchlessly with the RFID transponder of the sensor assembly by means of the RFID reading device of the evaluation unit, wherein the RFID transponder is supplied by the RFID reading device with electrical energy which is stored in the RFID transponder, the communication between the RFID reading device and the RFID transponder is then interrupted and a vibration determination is carried out by means of the sensor assembly, wherein the acceleration sensor unit of the sensor assembly is supplied with electrical energy via the RFID transponder and, following the vibration determination, the communication between the RFID reading device and the RFID transponder is re-established in order to transmit the sensor data determined by the sensor assembly by means of the RFID transponder to the RFID reading device of the evaluation unit.

15. The device as claimed in claim 6, wherein the at least one evaluation unit is further configured to control the sensor assembly.

16. The device as claimed in claim 6, wherein the at least one evaluation unit is further configured to regulate the sensor assembly.

* * * * *

UNITED STATES PATENT AND TRADEMARK OFFICE
CERTIFICATE OF CORRECTION

| | | |
|---|---|---|
| PATENT NO. | : 9,589,163 B2 | Page 1 of 1 |
| APPLICATION NO. | : 14/379765 | |
| DATED | : March 7, 2017 | |
| INVENTOR(S) | : Reinhard Jurisch et al. | |

It is certified that error appears in the above-identified patent and that said Letters Patent is hereby corrected as shown below:

In the Claims

Column 14, Line 59, Claim 8:
After "of at least one of firmly bonded"
Delete "from-fitted" and
Insert --form-fitted--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*